(12) United States Patent
Bensussan et al.

(10) Patent No.: US 11,566,656 B2
(45) Date of Patent: Jan. 31, 2023

(54) FASTENER WITH RETENTION ELEMENT

(71) Applicant: Melissa and Doug, LLC, Wilton, CT (US)

(72) Inventors: Bernard Bensussan, Stratford, CT (US); Lyndall Carvell Fry, Wilton, CT (US); George LeMoine, Trumbull, CT (US)

(73) Assignee: Melissa & Doug, LLC, Wilton, CT (US)

( * ) Notice: Subject to any disclaimer, the term of this patent is extended or adjusted under 35 U.S.C. 154(b) by 362 days.

(21) Appl. No.: 16/777,596

(22) Filed: Jan. 30, 2020

(65) Prior Publication Data
US 2020/0256374 A1 Aug. 13, 2020

Related U.S. Application Data

(60) Provisional application No. 62/803,718, filed on Feb. 11, 2019.

(51) Int. Cl.
*F16B 39/28* (2006.01)
(52) U.S. Cl.
CPC .................................. *F16B 39/28* (2013.01)
(58) Field of Classification Search
CPC ......... F16B 37/00; F16B 39/28; F16B 39/282
USPC ................. 411/172, 173, 175, 183, 185, 427
See application file for complete search history.

(56) References Cited

U.S. PATENT DOCUMENTS

| | | | | |
|---|---|---|---|---|
| 4,116,573 A | * | 9/1978 | Fuchs | F16B 5/0607 403/264 |
| 4,139,314 A | | 2/1979 | Helmut | |
| 4,299,067 A | * | 11/1981 | Bertschi | E04B 2/7401 52/285.4 |
| 4,405,253 A | * | 9/1983 | Stockum | F16B 12/2027 403/231 |
| 4,701,065 A | * | 10/1987 | Orosa | F16B 37/122 403/217 |

(Continued)

FOREIGN PATENT DOCUMENTS

| | | |
|---|---|---|
| CN | 201297310 | 8/2009 |
| CN | 102128195 | 7/2011 |

(Continued)

OTHER PUBLICATIONS

EP Search Report mailed in EP 20156015.8 dated Jun. 17, 2020.
Chinese Office Action for Application No. 202010084956.X, dated Aug. 22, 2022.

*Primary Examiner* — Roberta S Delisle
(74) *Attorney, Agent, or Firm* — Wissing Miller LLP

(57) ABSTRACT

A fastener including a screw receiving element extending along a first axis and having a first end and a second end, the screw receiving element including a through hole extending through a thickness of the screw receiving element perpendicular to the first axis, the fastener further including a retention element arranged at the first end of the screw receiving element, wherein the retention element is plate-shaped and extends in a direction perpendicular to the first axis of the screw receiving element, and the retention element further includes a panel facing surface extending in a plane substantially perpendicular to the first axis of the screw receiving element, and side surfaces extending in planes substantially along the first axis of the screw receiving element.

16 Claims, 26 Drawing Sheets

(56) References Cited

U.S. PATENT DOCUMENTS

| | | | | |
|---|---|---|---|---|
| 4,981,388 | A * | 1/1991 | Becken | F16B 37/047 403/258 |
| 5,795,029 | A * | 8/1998 | Ma | A47C 7/42 297/440.16 |
| 6,457,923 | B1 * | 10/2002 | Grossman | F16B 12/14 411/169 |
| 6,478,518 | B1 * | 11/2002 | Hwang | F16B 12/14 411/178 |
| 6,503,020 | B1 * | 1/2003 | Mascioletti | E04B 1/2604 403/231 |
| 6,695,523 | B2 * | 2/2004 | Lewis | B41J 19/00 403/258 |
| 8,641,318 | B2 * | 2/2014 | Theriault | F16B 37/122 403/404 |
| 8,807,898 | B2 * | 8/2014 | Nelson | A63B 17/04 411/174 |
| 2002/0094254 | A1 * | 7/2002 | Grossman | F16B 12/14 411/104 |

FOREIGN PATENT DOCUMENTS

| | | |
|---|---|---|
| CN | 202056145 | 11/2011 |
| CN | 20341317 | 7/2012 |
| CN | 105757084 | 7/2016 |
| CN | 108700100 | 10/2018 |
| EP | 1352177 | 10/2003 |
| EP | 1580763 | 9/2005 |
| JP | 2009210036 A | 9/2009 |

* cited by examiner

FASTENER WITH RETENTION ELEMENT

This application claims priority under 35 U.S.C. § 119 to U.S. Provisional Patent Application No. 62/803,718, filed on Feb. 11, 2019. The disclosure of that application is incorporated herein by reference.

BACKGROUND OF THE INVENTION

1. Field of the Invention

The present disclosure relates to devices, systems, and methods for a fastener with a retention element.

2. Description of the Related Art

Medium-density fiberboard (MDF) is an engineered wood product. It is made by combining wood fibers, wax, and resin in a mold and applying high temperatures and pressures. The result is a board that is denser than plywood and particle board.

Difficulties arise when MDF is used to form structures, such as furniture, where various panels are assembled together. In some arrangements, such as where MDF panels are joined together at a 90 degree angle, it is difficult to use screws to directly join the panels because MDF panel ends are susceptible to stripping or crumbling. Accordingly, it is known to use cylindrical shaped metal nuts (also known as metal dowels or barrel nuts) with connector bolts to join two MDF panels at a 90 degree angle. However, such metal nuts are difficult to properly align and susceptible to rotation during assembly. An improved configuration is needed.

BRIEF SUMMARY OF THE INVENTION

In an embodiment, a fastener is provided, the fastener including a screw receiving element extending along a first axis and having a first end and a second end, the screw receiving element including a through hole extending through a thickness of the screw receiving element perpendicular to the first axis, the fastener further including a retention element arranged at the first end of the screw receiving element, wherein the retention element is plate-shaped and extends in a direction perpendicular to the first axis of the screw receiving element, and the retention element further includes a panel facing surface extending in a plane substantially perpendicular to the first axis of the screw receiving element, and side surfaces extending in planes substantially along the first axis of the screw receiving element.

According to another embodiment a fastener is provided. The fastener includes a screw receiving element extending along a first axis and having a side and a first end and a second end and a screw receiving hole extending into the side of the screw receiving element between the first and second ends. A retention element is arranged at the first end of the screw receiving element. The retention element is plate-shaped and extends in a plane perpendicular to the first axis of the screw receiving element. The retention element may include one or more lobes extending in the plane perpendicular to the first axis. According to one aspect the retention element has two lobes and each lobe extends in opposite directions in the plane. According to another aspect the retention element has a polygonal shape, an oval shape, or an irregular shape. The second end of the screw receiving element may have a radiused or chamfered edge. The retention element may have a planar outer face with the outer face disposed on a surface of the retention element opposite to the screw receiving element. The screw receiving element may cylindrical with the screw receiving hole extending along a diameter of the screw receiving element. The screw receiving hole may have a circular cross section. According to another aspect the screw receiving hole has an oblong cross section with a major axis of the oblong cross section along the first axis. According to another aspect the screw receiving hole includes a tapered portion. According to a further aspect the retention element has one or more edge surfaces and at least one of the edge surfaces includes a barb.

According to another embodiment, there is provided a joint formed from a first panel, a second panel, a screw, and a fastener. The first panel has a first through hole extending through a first thickness thereof. The second panel has an outside surface, a fastener cavity, and a second through hole aligned with the first through hole and extending from an edge of the second panel to the fastener cavity. The fastener cavity has an inner surface of substantially the same shape as an outer surface of the fastener. The fastener cavity has a blind hole portion and a recessed portion. The fastener includes a screw receiving element extending along a first axis and having a side, a first end, and a second end with the screw receiving element disposed in the blind hole portion of the cavity. The fastener also includes a screw receiving hole extending into the side of the screw receiving element between the first and second ends with the screw receiving hole aligned with the first and second through holes of the first and second panels. The fastener also includes a retention element arranged at the first end of the screw receiving element and extending in a plane perpendicular to the first axis of the screw receiving element. The retention element is disposed in the recessed portion of the cavity. Engagement between the retaining element and the recessed portion of the cavity aligns the screw receiving hole and the second through hole. The screw passes through the first and second through holes and at least partially into the screw receiving hole of the screw receiving element. The retention element may have a panel facing surface and an outward facing surface and the recessed portion of the cavity may have an inner surface parallel to the outside surface of the second panel so that when the panel facing surface contacts the inner surface of the cavity and the outward facing surface is substantially coplanar with the outside surface of the second panel. According to one aspect the screw receiving element is cylindrical and the screw receiving hole extends along a diameter of the screw receiving element. According to another aspect the screw receiving hole has an oblong cross section and a major axis of the oblong cross section is along the first axis. The screw receiving hole may also have a tapered portion and the screw may engage the tapered portion. According to another aspect the second end of the screw retaining element comprises a radiused or chamfered edge that is shaped to facilitate insertion of the fastener into the cavity. According to a further aspect the retaining element has one or more barbs arranged to engage with a surface of the cavity.

The above stated aspect, as well as other aspects, features and advantages of the invention will become clear to those skilled in the art upon review of the following description. It should be understood that the description and specific examples, while describing several exemplary embodiments, are intended for purposes of illustration only and are not intended to limit the scope of the invention.

BRIEF DESCRIPTION OF THE DRAWINGS

The above and/or other aspects of the disclosure will be more apparent by describing in detail exemplary embodiments of the disclosure with reference to the accompanying drawings, in which.

DETAILED DESCRIPTION OF EXEMPLARY EMBODIMENTS

Figure 1:
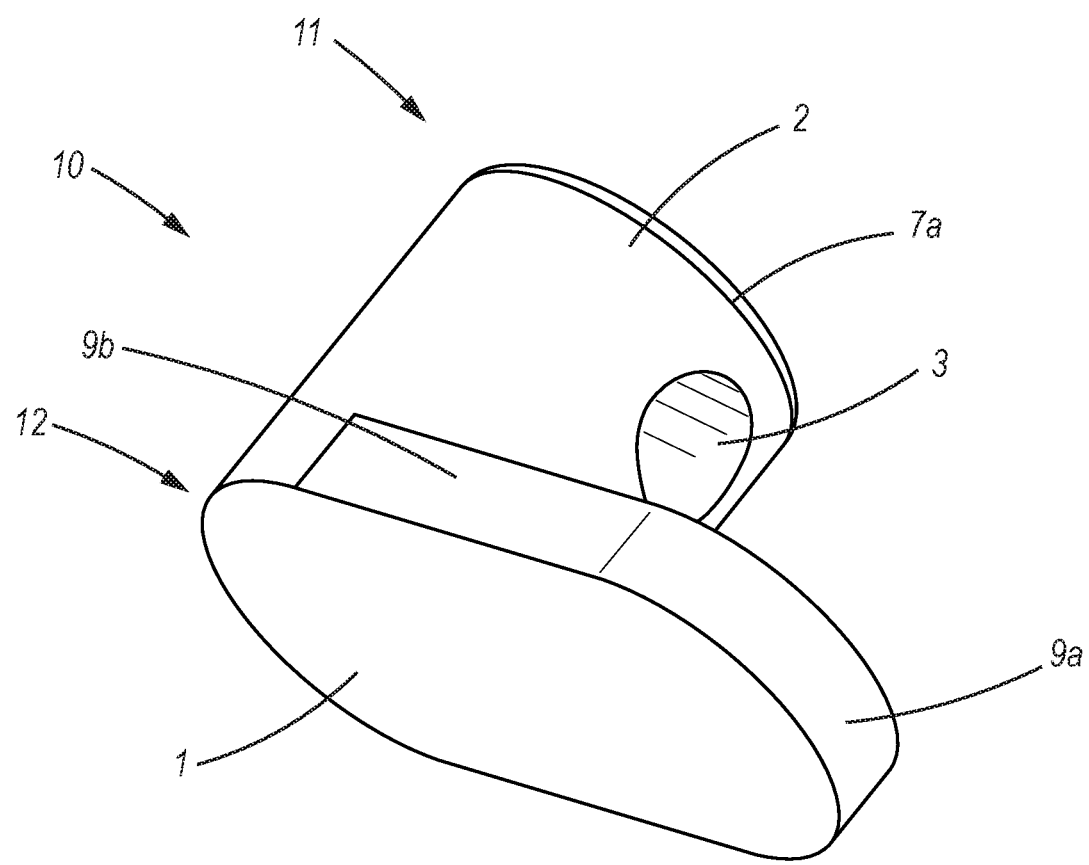
FIG. 1 is a perspective view of an exemplary embodiment of a fastener as described herein.
Figure 2:
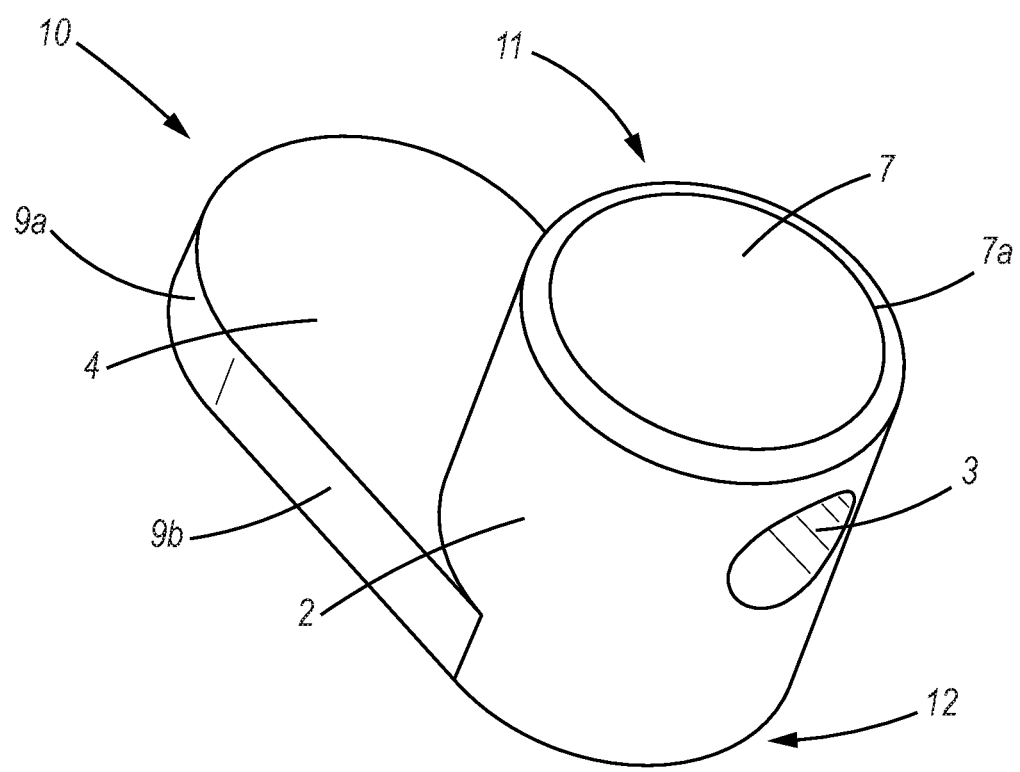
FIG. 2 is another perspective view of the fastener.
Figure 3:
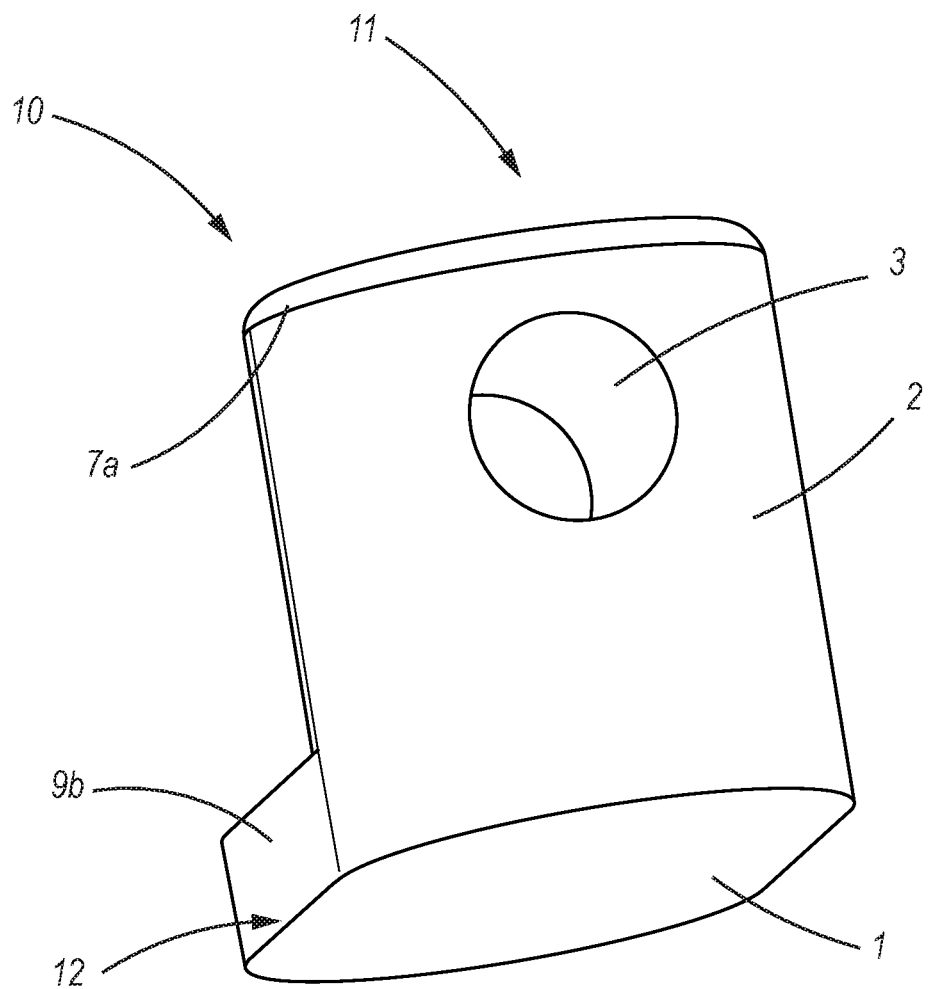
FIG. 3 is another perspective view of the fastener.
Figure 4:
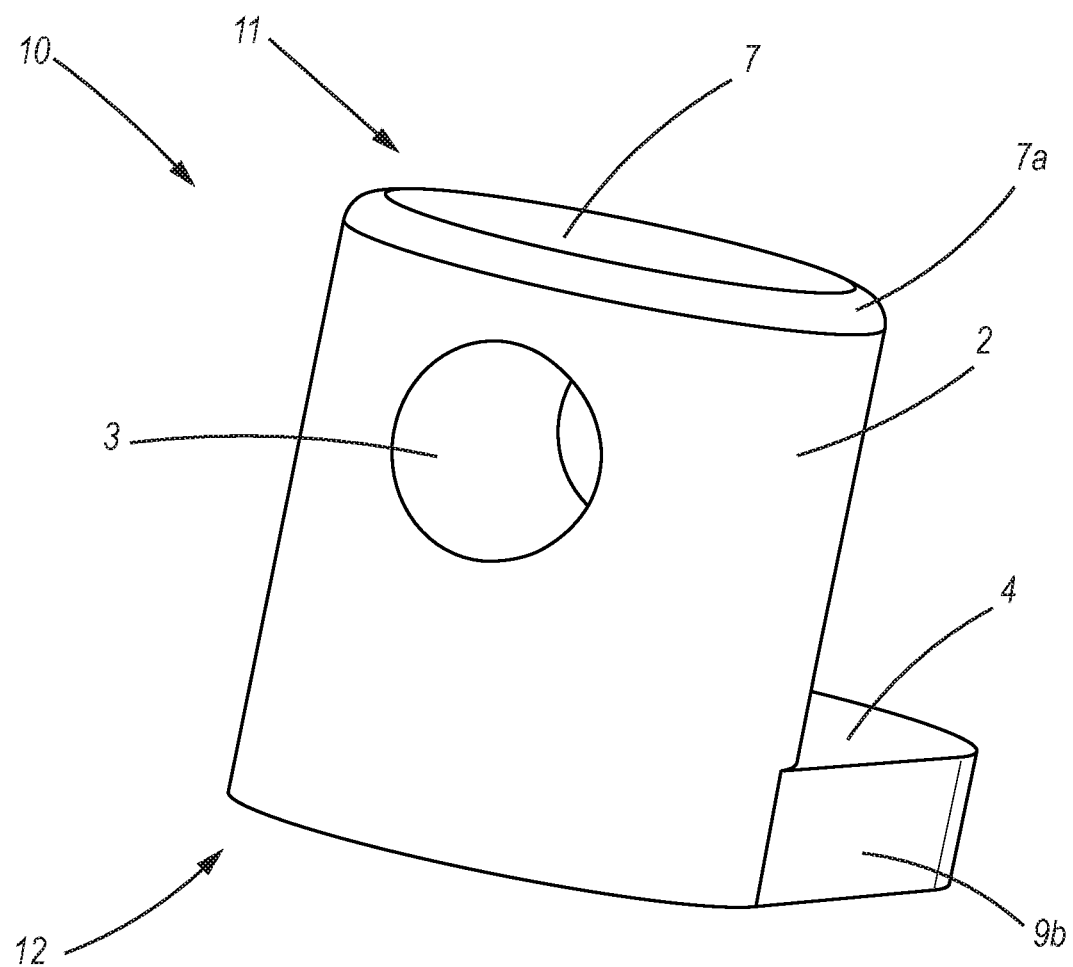
FIG. 4 is another perspective view of the fastener.
Figure 5:
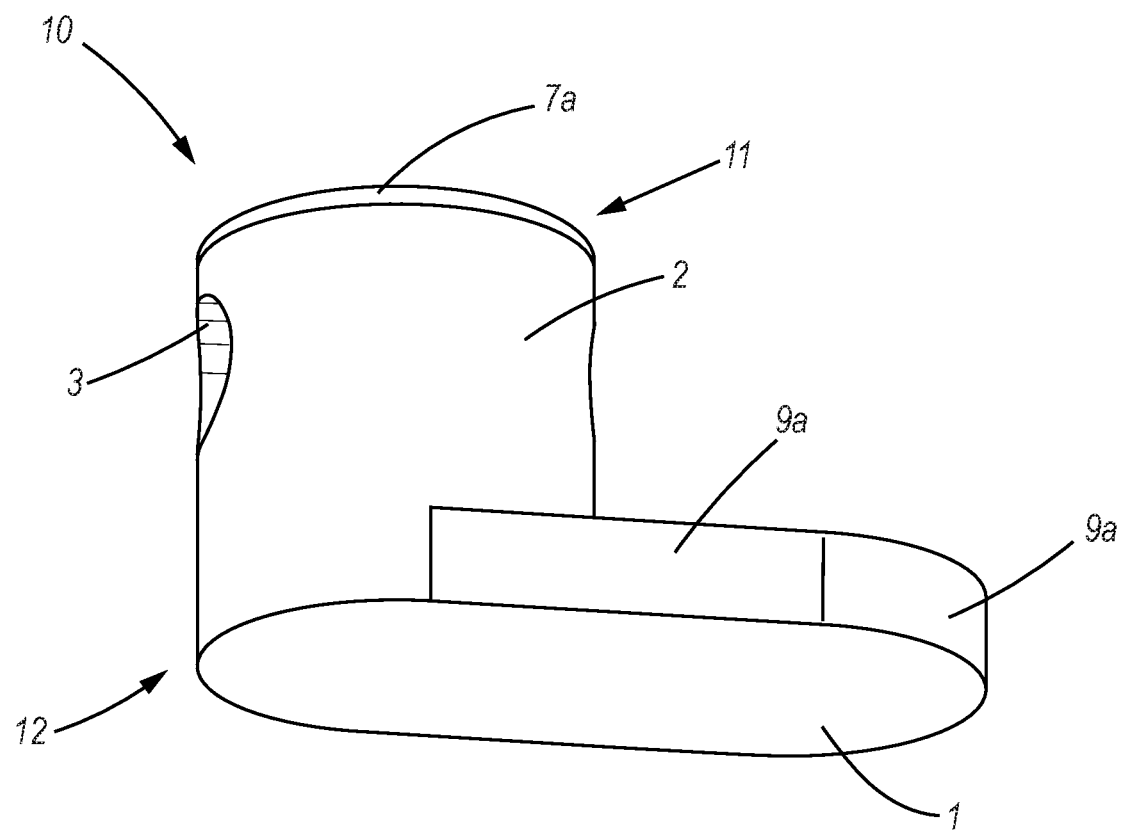
FIG. 5 is another perspective view of the fastener.
Figure 6:
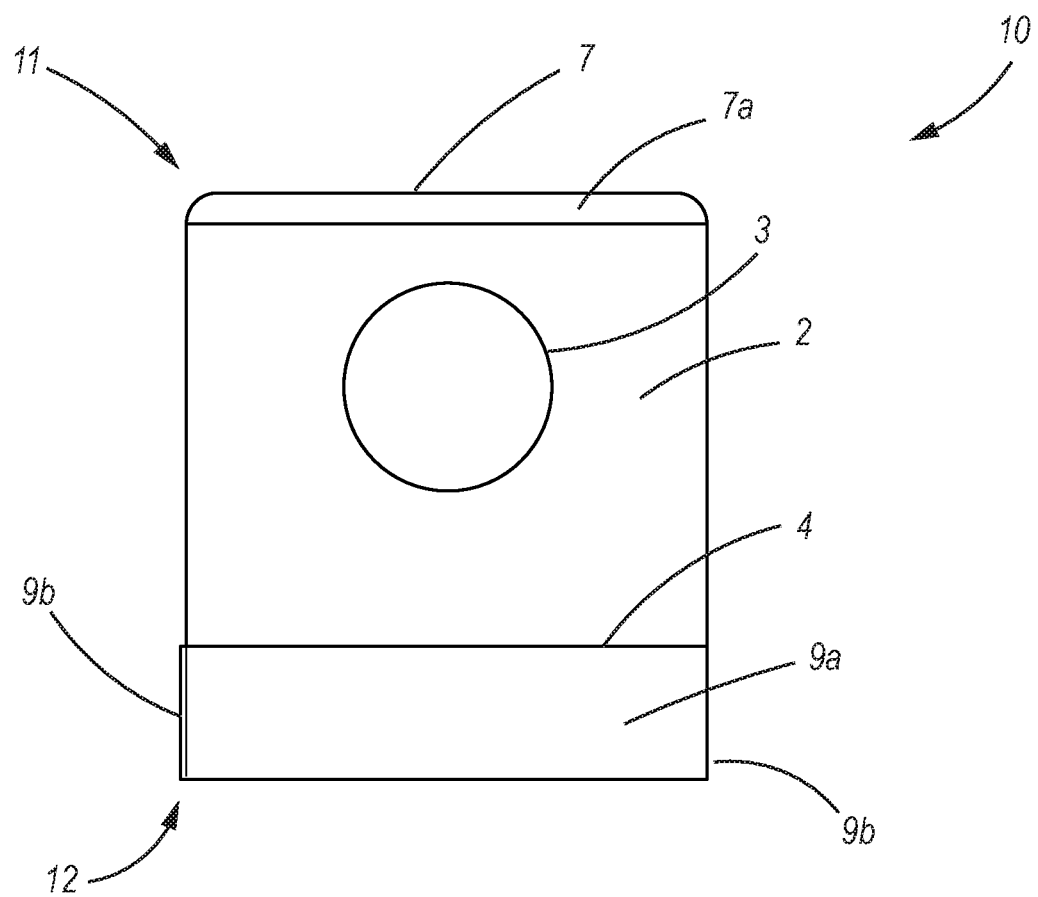
FIG. 6 is a rear elevation view of the fastener.
Figure 7:
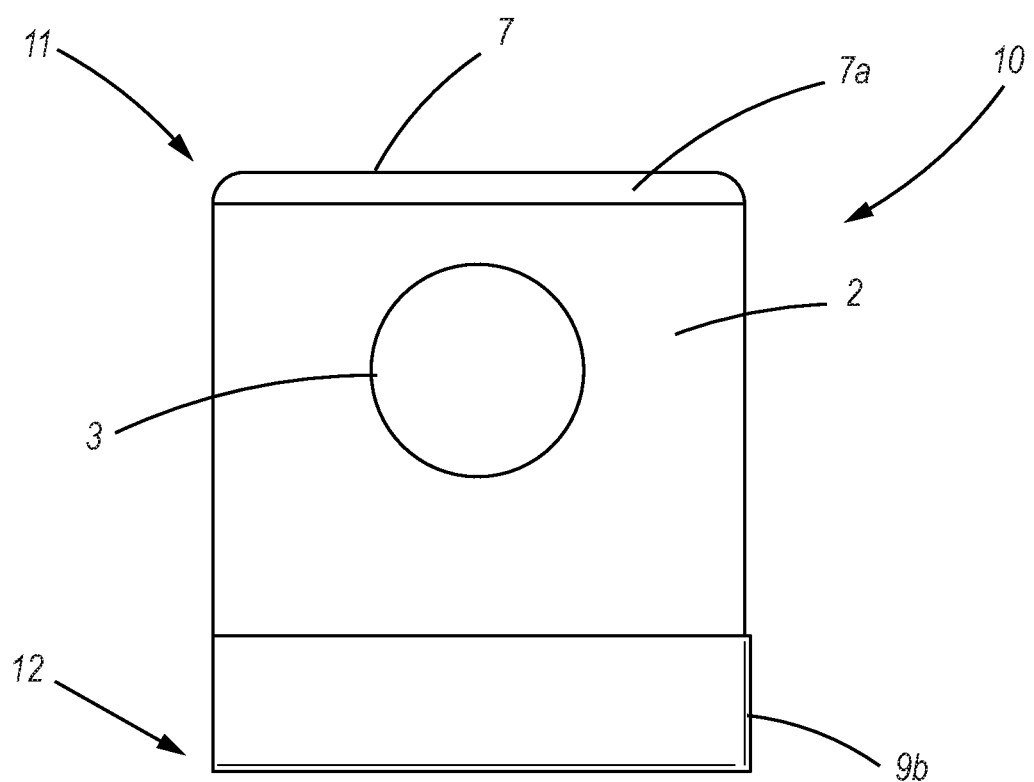
FIG. 7 is a front elevation view of the fastener.
Figure 8:
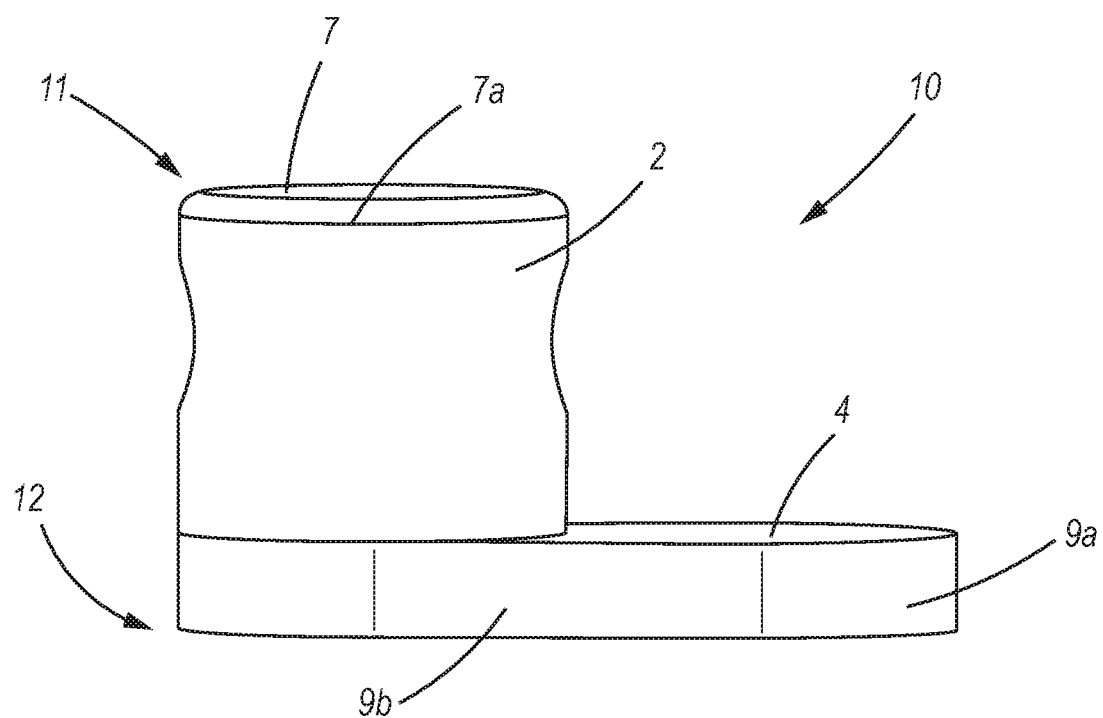
FIG. 8 is a right elevation view of the fastener.
Figure 9:
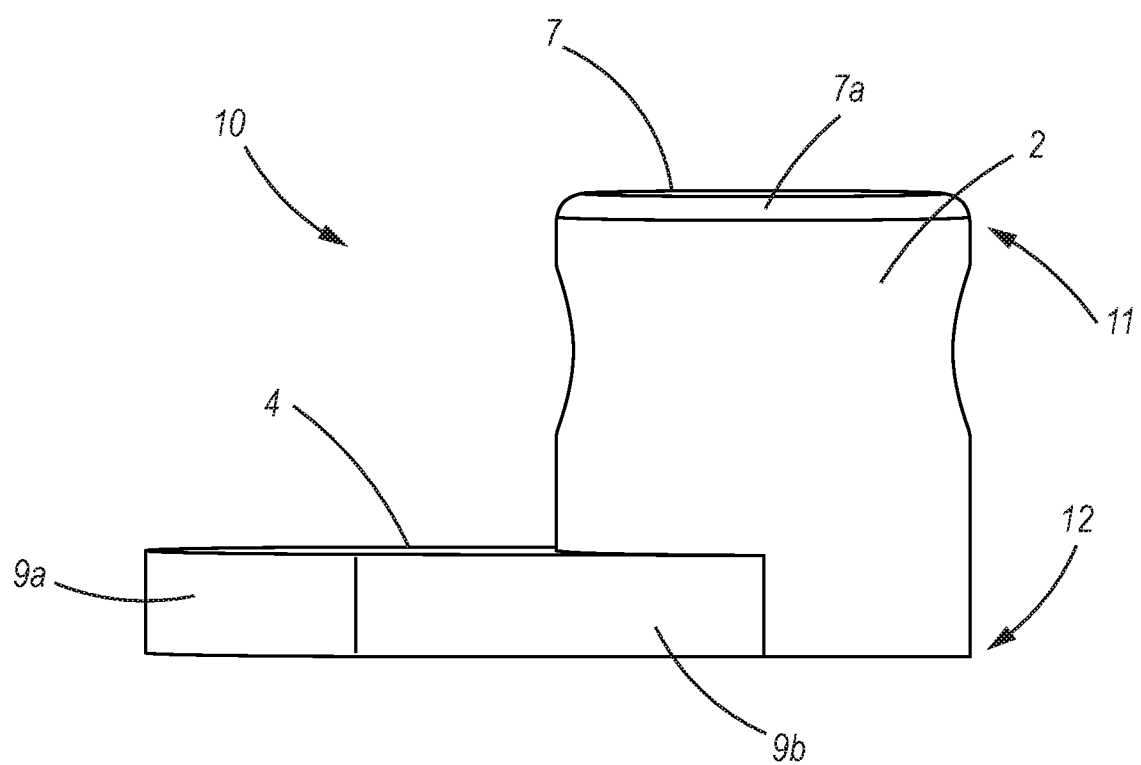
FIG. 9 is a left elevation view of the fastener.
Figure 10:
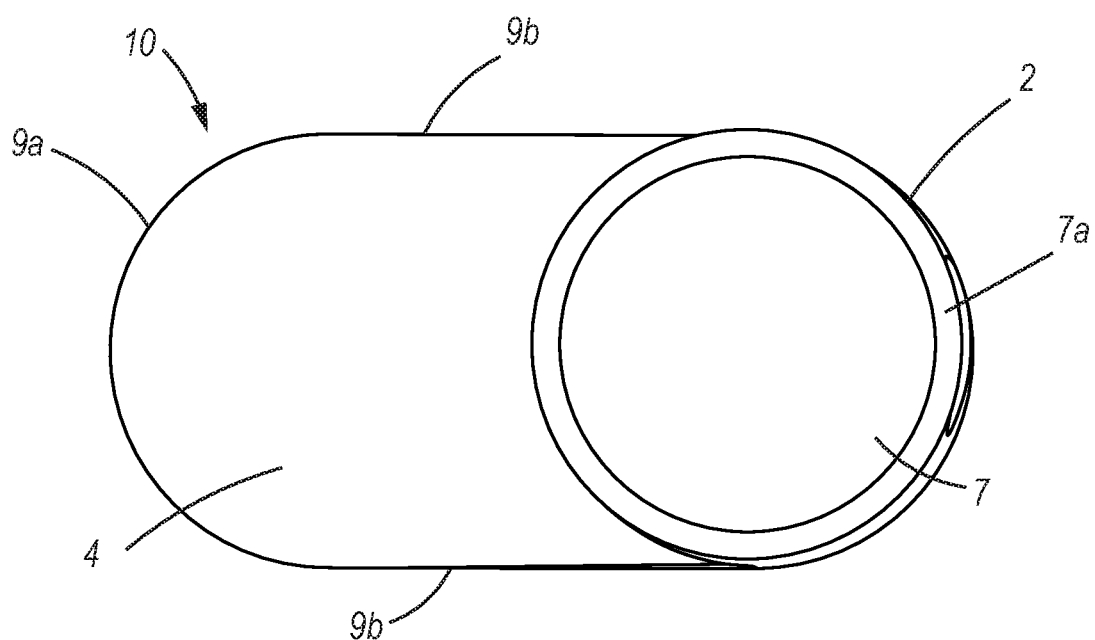
FIG. 10 is a top plan view of the fastener.
Figure 11:
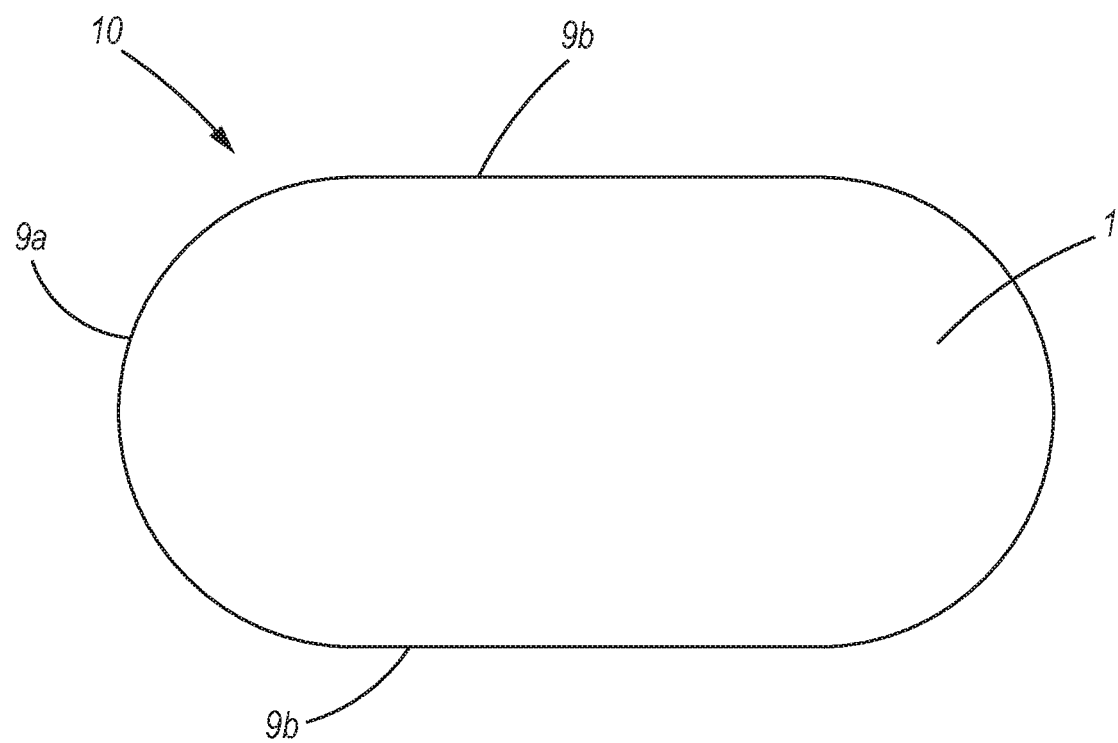
FIG. 11 is a bottom plan view of the fastener.

Exemplary embodiments of the disclosure will now be described below by reference to the attached Figures. The described exemplary embodiments are intended to assist the understanding of the invention and are not intended to limit the scope of the invention in any way. Like reference numerals refer to like elements throughout.

An exemplary embodiment of the fastener is shown in FIGS. 1-11. As shown in these Figures, fastener 10 is provided with several features. First, fastener 10 includes screw receiving element 2 that extends along a first axis (its long axis) and has a first end 12 and second end 11. In this embodiment, screw receiving element is cylindrical, but other appropriate shapes may be used. Second end 11 has a second face 7, and the transition between the outer surface of screw receiving element 2 and second face 7 has radius 7a, the function of which is discussed below. Screw receiving element 2 also includes a through hole 3 for receiving a threaded fastener in the manner discussed below. The through hole 3 extends through the entire thickness of screw receiving element 2; in this embodiment through hole 3 extends along a diameter of the cylindrical shape of screw receiving element 2.

Fastener 10 also includes retention element 1 arranged at the first end 12 of the screw receiving element 2. In this exemplary embodiment retention element 1 is plate-shaped with a generally constant thickness. Retention element 1 is oblong and extends as a lobe in a direction perpendicular to the long axis of the screw receiving element 2. In this embodiment, retention element 1 includes panel facing surface 4 extending in a plane perpendicular to the long axis of the screw receiving element 2, and side surfaces 9b and end surface 9a, extending in planes along the long axis of the screw receiving element 2.

Fastener 10 may be formed of any suitable material that provides the functionality described below. In the exemplary embodiment described here, fastener 10 is formed of polypropylene. Alternative plastics may be chosen based on the particular application and may balance manufacturability, ease of insertion and interface with a screw (as described below), and strength of the resultant assembly. According to other embodiments, other materials may be used, for example, polymers, metals, composite materials, wood, and the like.

An exemplary embodiment of a connection using the fastener shown in FIGS. 1-11 is depicted in FIGS. 12A-19. In this embodiment, panel 100 is connected to panel 110, with screw 300 passing through a thickness of panel 100 and into the end of panel 110, where fastener 10 is installed.

Figure 16:
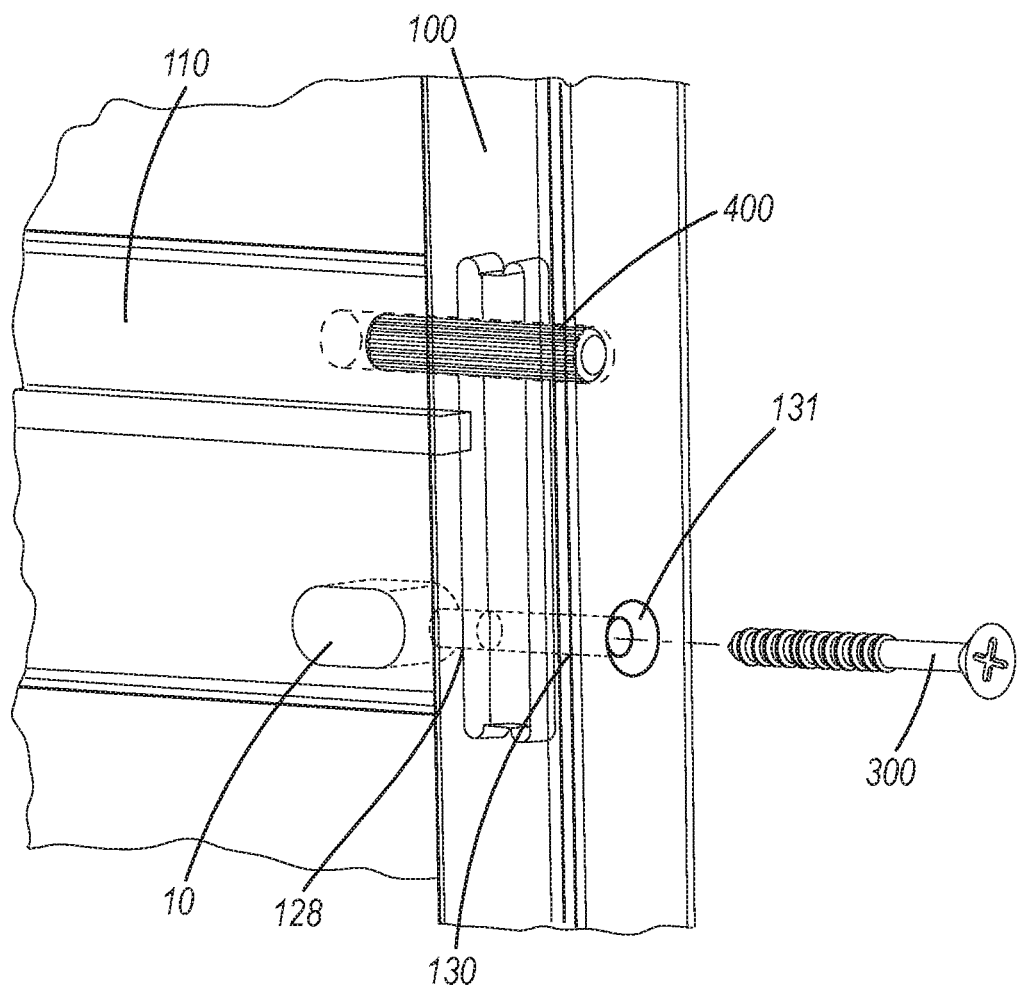

As can be more clearly seen in FIGS. 13-16, where the panel surfaces have been made invisible, panel 100 is located and connected to panel 110 by the compression formed by the connection between screw 300 and fastener 10, along with optional dowel 400. More specifically, to connect panels 100 and 110 together, dowel 400 is inserted into one of the panels 110 and 120, fastener 10 is arranged in a fastener cavity 120 of panel 110 (described below), and the panel with dowel 400 is brought to the other panel, which is then pushed onto the dowel 400. As shown in FIG. 16, screw hole 130 in panel 100 and screw hole 128 in panel 110 are then aligned, and screw 300 is then inserted through screw holes 130 and 128 and driven into fastener 10 to tighten the connection.

In this embodiment, screw holes 130 and 128 are pre-formed in panels 100 and 110 and are dimensioned such that the threads of screw 300 do not bite into their inner surfaces. This prevents the chances of crumbling or splitting of panels 100 and 110. Instead, the screw threads bite into the inside of screw through hole 3 of fastener 10. However, screws utilized with the exemplary fastener can be dimensioned in any suitable manner, and may interface with the screw holes in panels where the panels are robust enough to allow such an interface without crumbling or splitting, or may even be self-drilling or self-tapping.

In this embodiment, screw 300 may be tightened until its head seats into the corresponding depression 131 around screw hole 128 and sandwiches the thickness of panel 100 between the head of screw 300 and the end of panel 110, which is in turn driven towards panel 100 by the compression forces imparted by the interface of screw 300 and fastener 10. Once the connection is sufficiently tightened, assembly is complete. As described above, fastener 10 includes both a screw receiving element 2 and a retention element 1. Retention element 1 corrects the deficiencies of the prior art by allowing fastener 1 to be inserted and aligned in a single step, by a single hand, and prevents the fastener 1 from rotating after insertion or while screw 300 is being driven therein.

Figure 17:
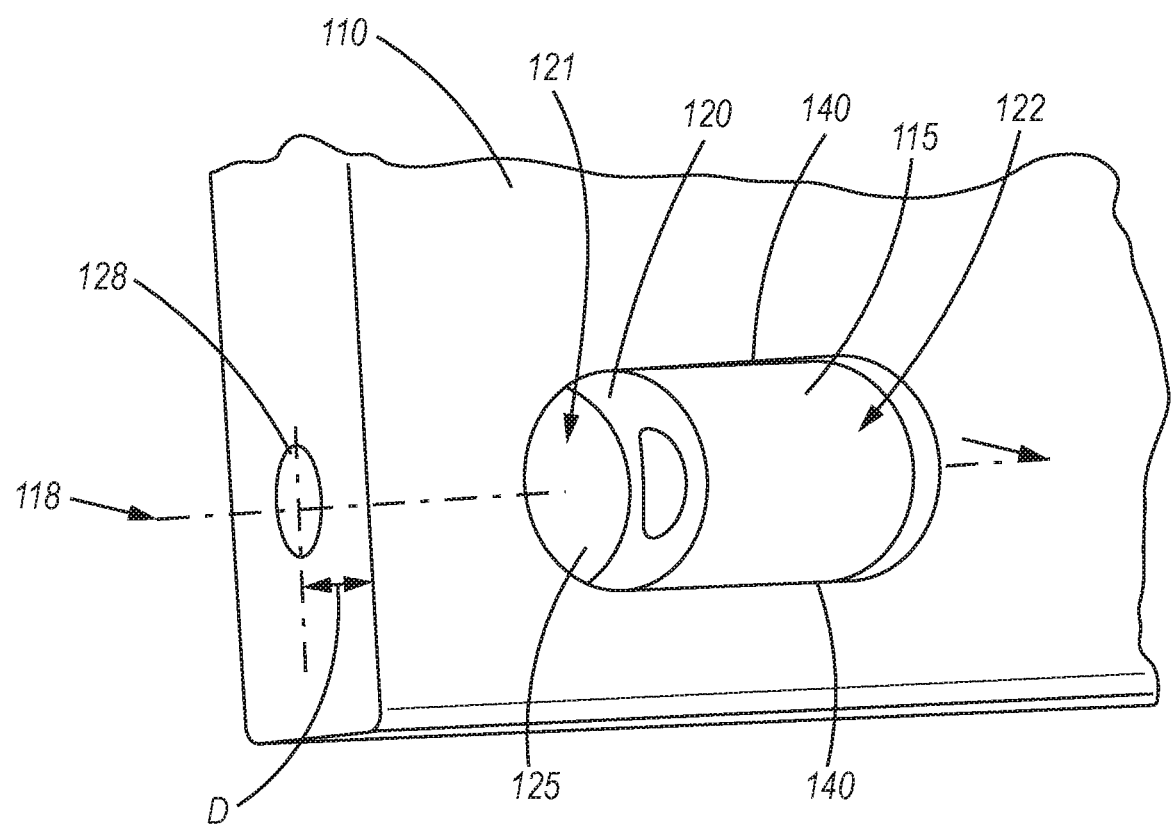
FIG. 17 is a perspective view of an exemplary fastener holding cavity according to an exemplary embodiment.
Figure 18:
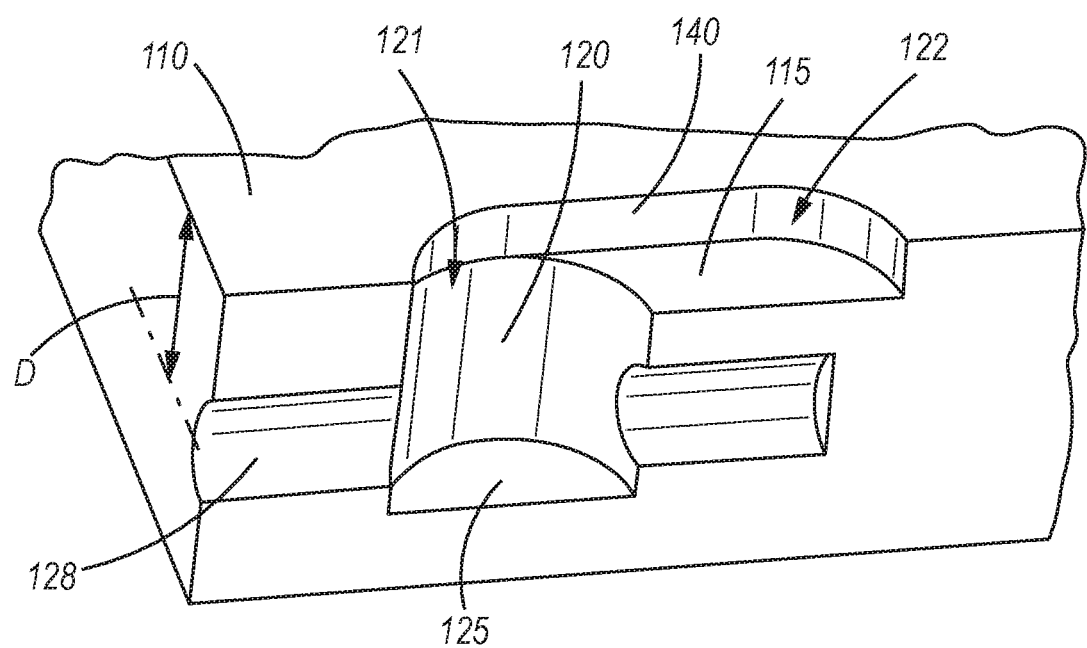
FIG. 18 is a cross section therethrough along the long axis.
Figure 19:
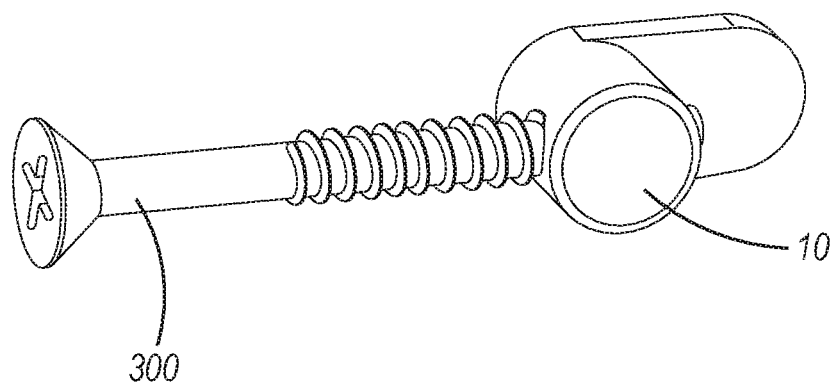
FIG. 19 is a view of a screw and fastener assembled according to an exemplary embodiment.

Specifically, as shown in FIGS. 17 and 18, panel 110 is provided with fastener cavity 120 that has an inner surface of substantially the same shape as the outer surface of fastener 10, such that it allows fastener to be inserted in only one direction, thereby easing assembly and assuring the alignment of through hole 3, screw hole 130, and screw hole 128. Additionally, the shape of retention element 1 and fastener cavity 120 provides the person inserting fastener with a visual aid to indicate how the fastener 10 should be inserted.

Cavity 120 formed in panel 110 includes a blind hole portion 121 shaped to accept screw receiving element 2 and recessed portion 122 shaped to accept retention element 1. Screw hole 128 is provided in the edge of panel 110 at a distance "D" from the face of the panel so that it aligns with through hole 3 when the fastener is inserted in cavity 120. The location of screw hole 128 may be selected to correspond with the dimensions of panels being joined by the fastener and screw. In the embodiment shown in FIGS. 12A and 12B, the position of hole 128 may be at the midpoint of the thickness of panel 110.

As mentioned above, during assembly, fastener 10 is inserted into fastener cavity 120. In this exemplary embodiment, second face 7 of screw receiving element 2 abuts cavity bottom 125 and panel facing surface 4 abuts cavity upper face 115 to provide the appropriate depth to thereby allow fastener 10 to sit flush with the surface of panel 110. Cavity upper sides 140 abut side surfaces 9b of retention element 10 to prevent rotation of fastener 10 once it is inserted, thereby retaining alignment of through hole 3, screw hole 130, and screw hole 128.

In the exemplary embodiment, screw 300 is a blunt point screw. This provides a safety measure if the screw becomes dislodged. However, any appropriate screw can be utilized with the exemplary fastener.

In the exemplary embodiment, screw 300 has a countersunk flat head that interfaces with depression 131. However, any appropriate screw can be utilized with or without a depression.

In the exemplary embodiment, screw 300 is designed for plastic applications and utilizes a higher thread height that a typical machine screw, and the inner diameter of screw through hole 3 of fastener 10 and the threads of screw 300 are designed such that most of the thread height of the threads of the screw 300 bite into the inner surface of through hole 2 to provide a sufficiently strong connection. However, any appropriate screw that provides the requisite functionality can be utilized. According to one embodiment, fastener 10 is formed from a malleable material, for example, polypropylene, that deforms when the threads of screw 300 are driven into hole 3. According to another embodiment, fastener is formed from a harder material, for example, steel, and pre-cut threads are formed on the inside surface of hole 3 to engage with threads of screw 300.

Figure 24:
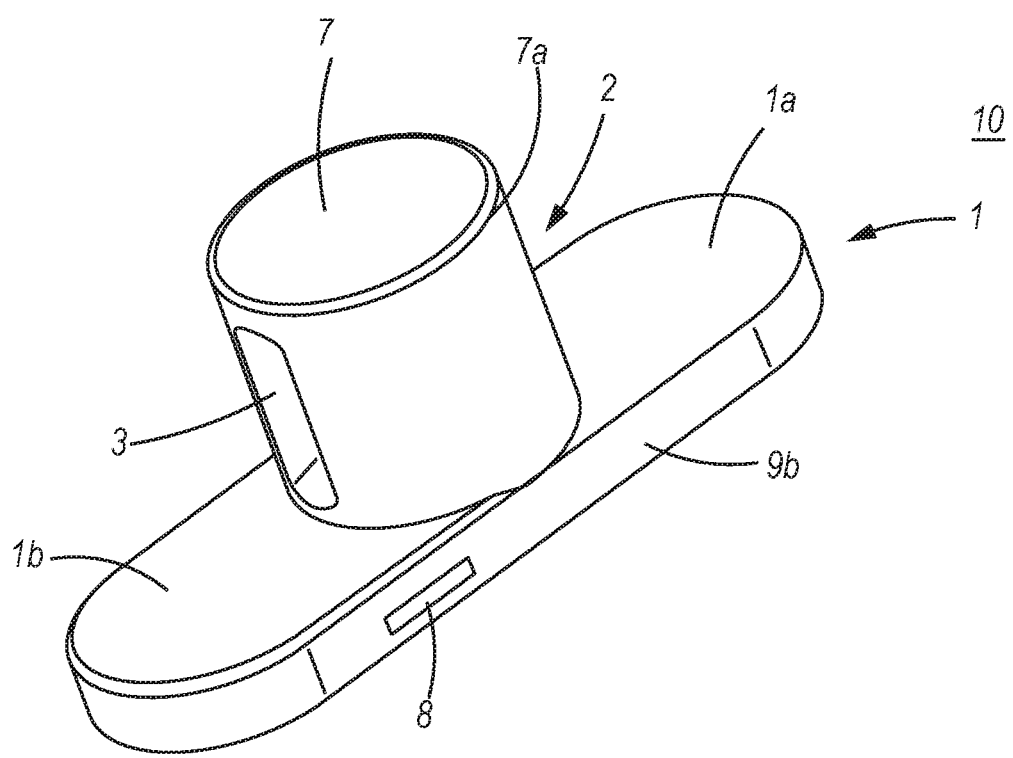
FIG. 24 is a perspective view of a still further exemplary embodiment of a fastener as described herein.

In the exemplary embodiment, screw receiving element 2 is cylindrical, but other shapes that provide the functionality disclosed herein may be used, including oval, square, triangular, etc. Similarly, while the retention element 1 is shown as being oval shaped (as shown in, e.g., FIG. 11), other shapes that provide the functionality disclosed herein may be used, including rectangular, triangular, etc. Additionally, while retention element 1 is shown in the exemplary embodiment as extending in one direction from screw receiving element 2, that is also not required. Retention element 1 may extend in more than one direction to provide the functionality described herein. FIG. 24 shows an exemplary embodiment with retention element 1 having two oblong lobes extending in two directions perpendicular to the axis of screw receiving element 2.

Further, while the surfaces of screw receiving element 2 and retention element 1 are shown extending primarily in directions along the long axis of screw receiving element 2 or perpendicular to that direction, these surfaces may also extend substantially along those directions, as long as the surfaces provide the functionality described herein. For example, the screw receiving element 2 may taper slightly along its long axis to ease its insertion into panel 110.

Radiused edge 7a is provided as discussed above to assist the insertion of fastener 10 into cavity 120. But in some embodiments radiused edge 7a may be chamfered or of some other shape, or deleted in favor of a more generally tapered screw receiving element 2.

In the exemplary embodiment, cavity 120 may be formed by standard wood manufacturing processes, such as CNC machining. As described above, screw receiving element 2 and retention element 1 may be of any shape that provides the functionality described herein and which has an outer surface that can be reproduced, in relevant part, as the inner surface of cavity 120. The cylindrical shape for screw receiving element 2 in the exemplary embodiment is advantageous in this regard because the corresponding portion of the inner surface of cavity 120 can be made with simple tools, such as drill or router, in one machining operation along one axis. The oval shape for retention element 1 in the exemplary embodiment is advantageous for similar manufacturability reasons. The reduction of machining operations in this manner reduces cost and cycle time and improves repeatability.

Figure 20:
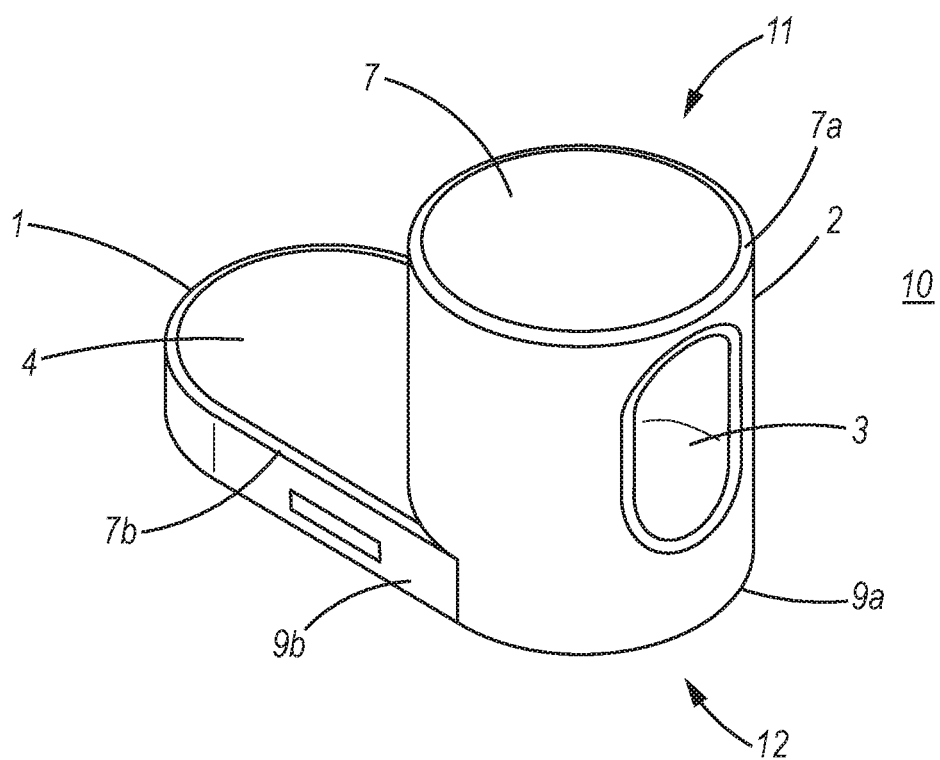
FIG. 20 is a perspective view of another exemplary embodiment of a fastener as described herein.

FIGS. 20-23B show another embodiment of the disclosure. FIG. 20 is a perspective view fastener 10 according to this embodiment. Screw receiving element 2 extends along a first axis from a first end 12 to a second end 11. Retention element 1 is disposed at the first end 12 of the screw receiving element 2. End portion 9a and side portions 9b form an end and sides, respectively, of retention element 1. Panel facing surface 4 is provided on one side of retention element 1. Screw receiving hole 3 extends through element 2.

Figure 12A:
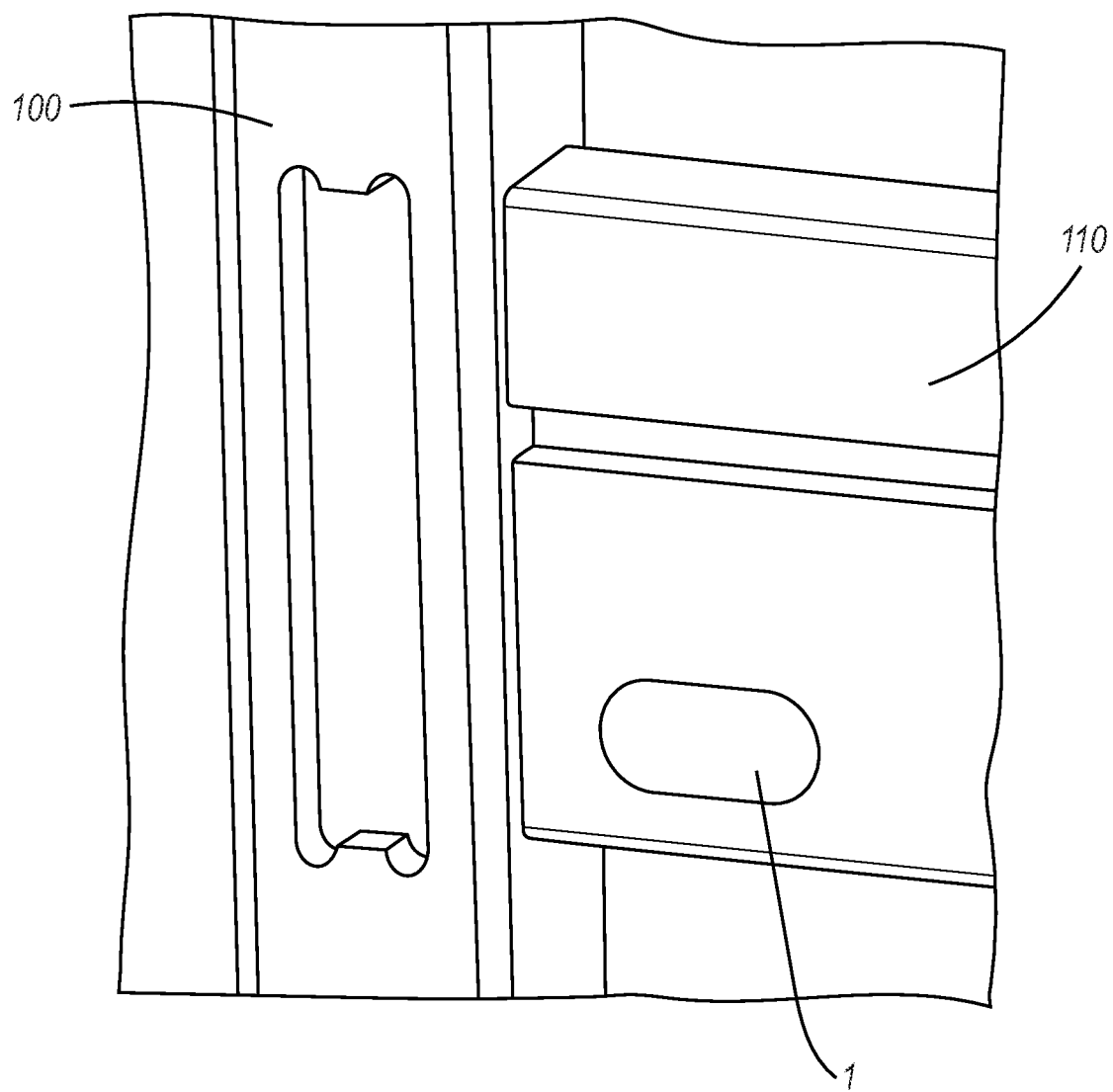
FIGS. 12A and 12B are perspective views of an exemplary embodiment of two panels joined by the exemplary fastener.
Figure 12B:
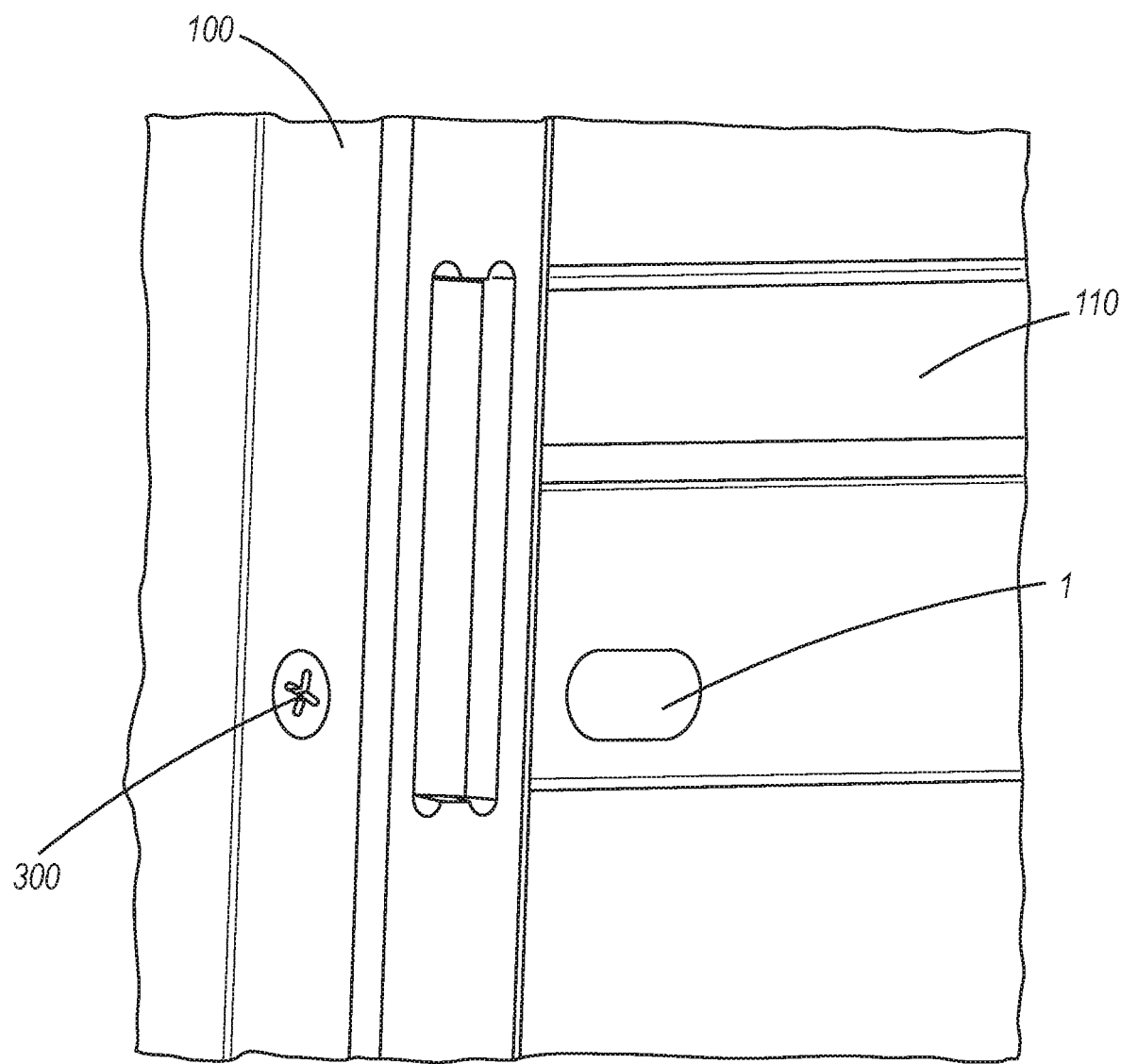
Figure 13:
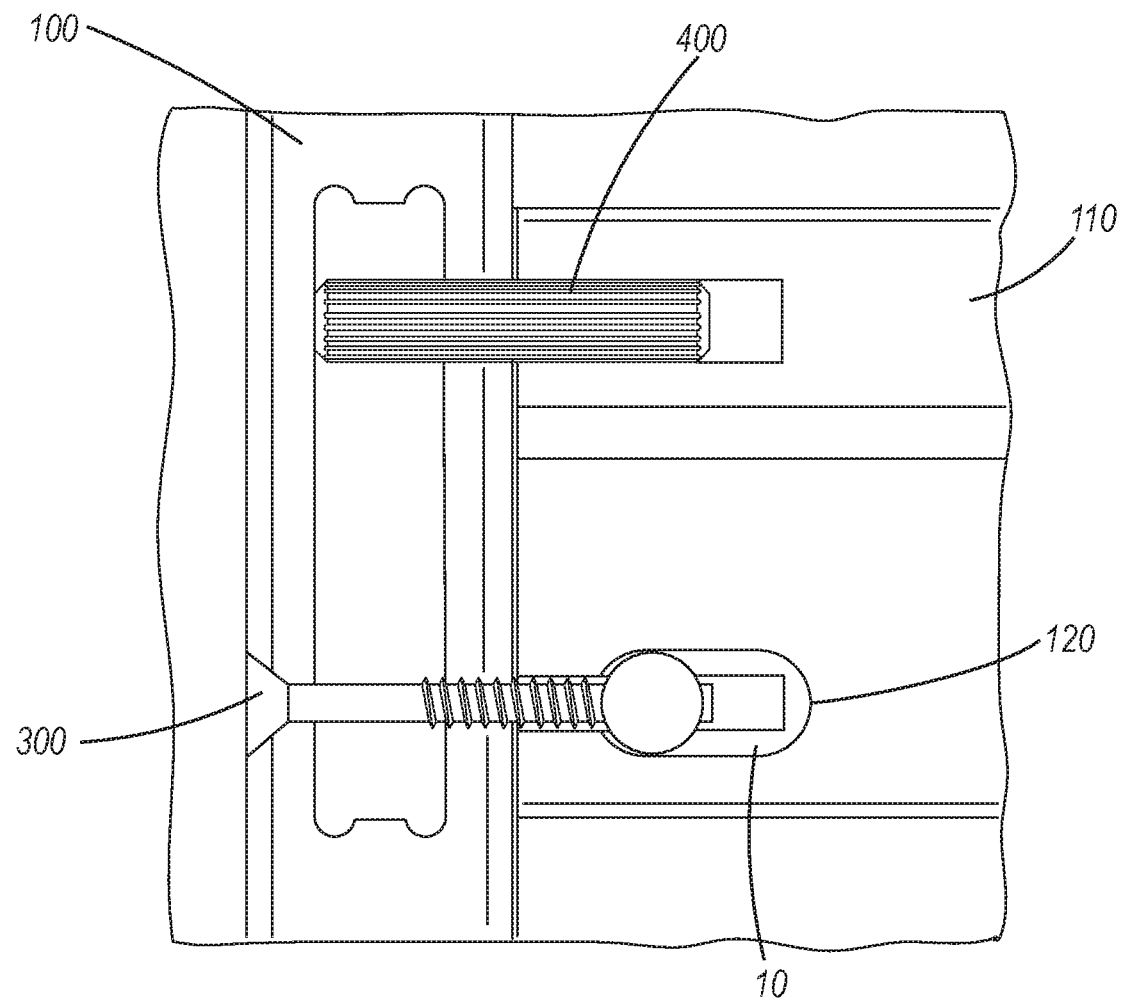
FIGS. 13 and 14 are front and perspective views of an exemplary embodiment of two panels joined by the exemplary fastener, with portions of the panels invisible.
Figure 14:
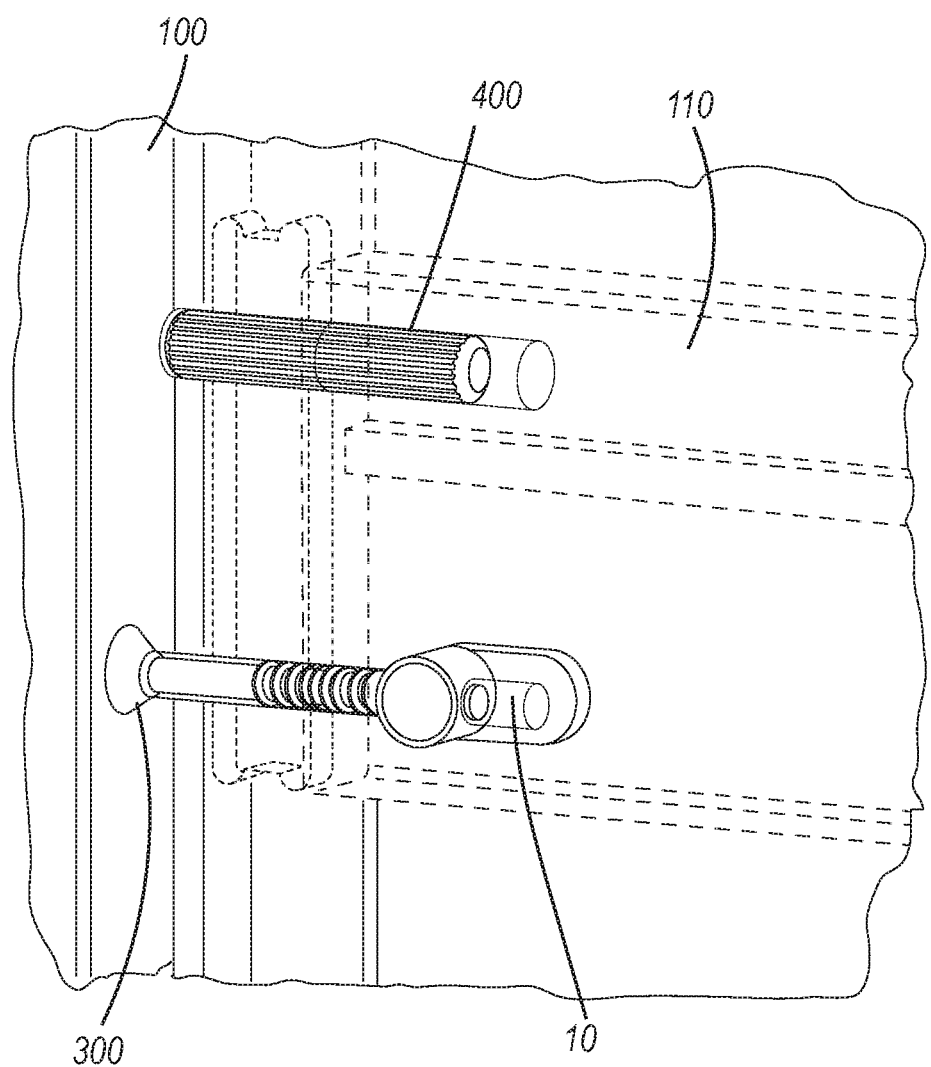
Figure 15:
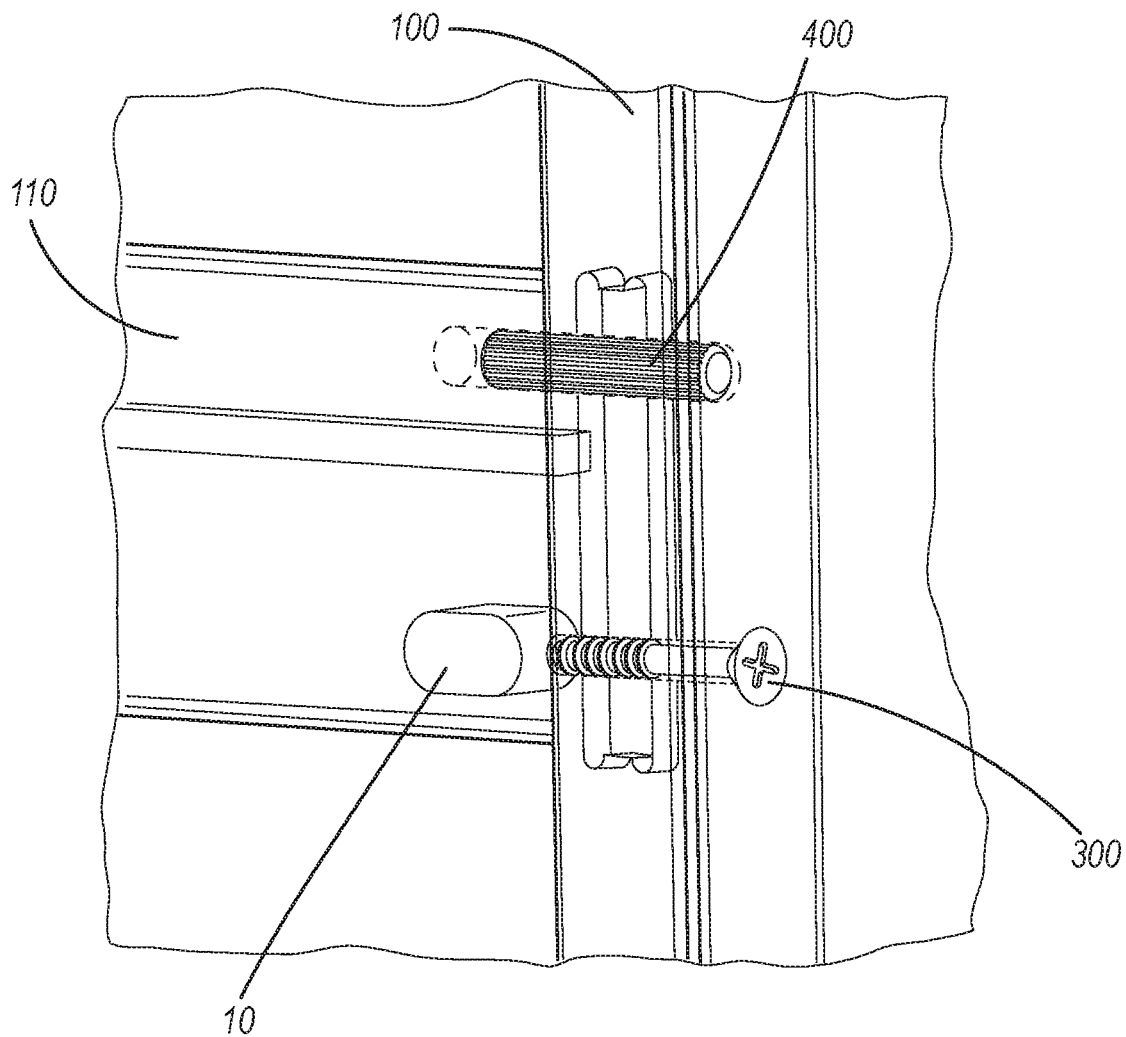
FIGS. 15 and 16 are perspective views of an exemplary embodiment of two panels joined by the exemplary fastener, with portions of the panels invisible.

In this embodiment, screw receiving hole 3 is oblong with its major axis along the first axis of element 2. By providing an oblong screw receiving hole that extends along the first axis, the fastener can connect with a screw at a range of distances with respect to retention element 1. In use, for example, as shown in FIGS. 12A and 12B, the fastener could accommodate the location of screw 300 at various distances "D" (as shown in FIGS. 17 and 18) relative to the surface of panel 110. In general, the distance "D" corresponds to about one half of the thickness of the panel. According to one embodiment, the length of oblong screw receiving hole 3 along the first axis allows panels with a thickness between about 9 mm and 12 mm to be joined. By selecting the length and position of hole 3 along the first axis of screw receiving element 2, panels with a range of thickness may be joined using the same fastener.

Figure 21:
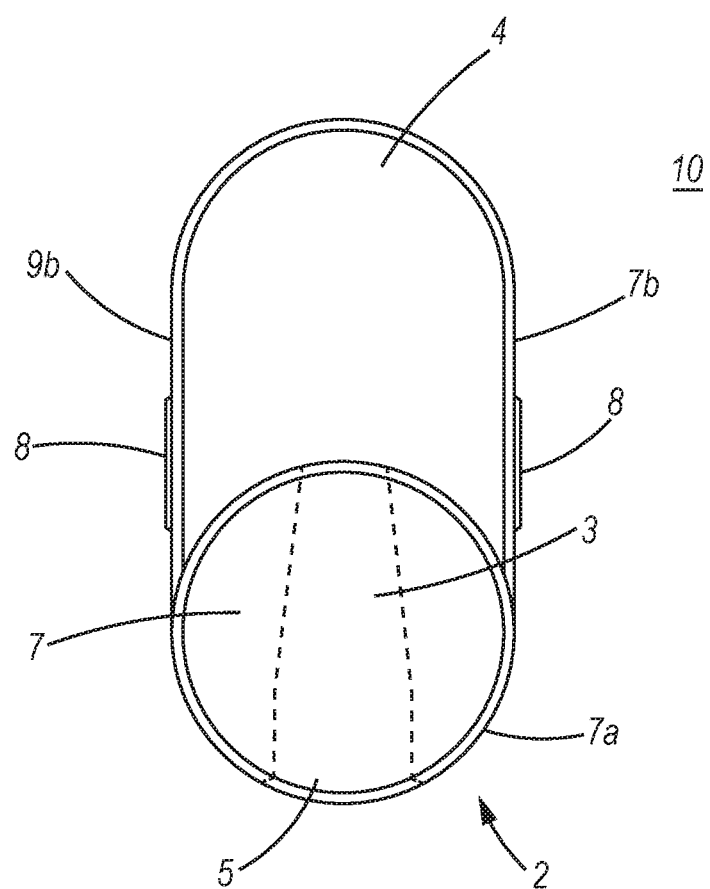
FIG. 21. is a top plan view of the exemplary fastener of FIG. 20.
Figure 22:
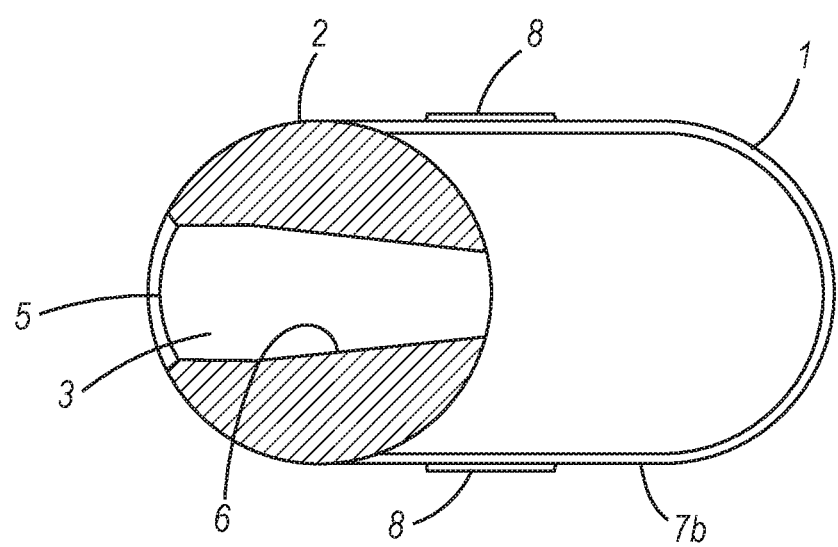
FIG. 22 is a cross sectional view of the exemplary fastener of FIG. 20.
Figure 23A:
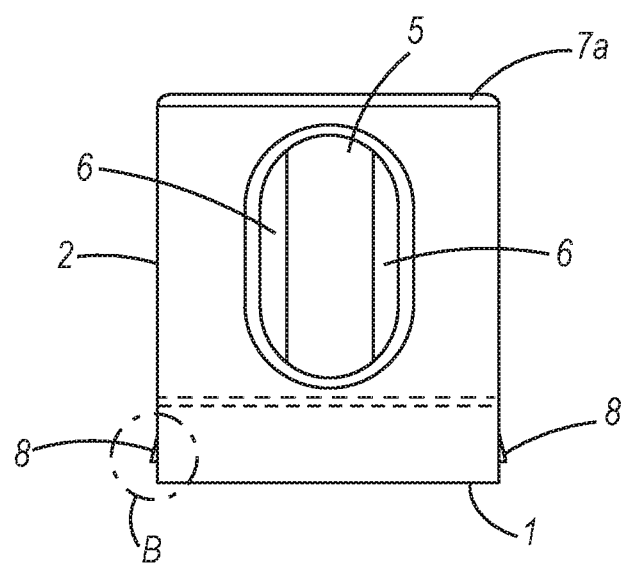
FIG. 23A is a front view of the exemplary fastener of FIG. 20
Figure 23B:
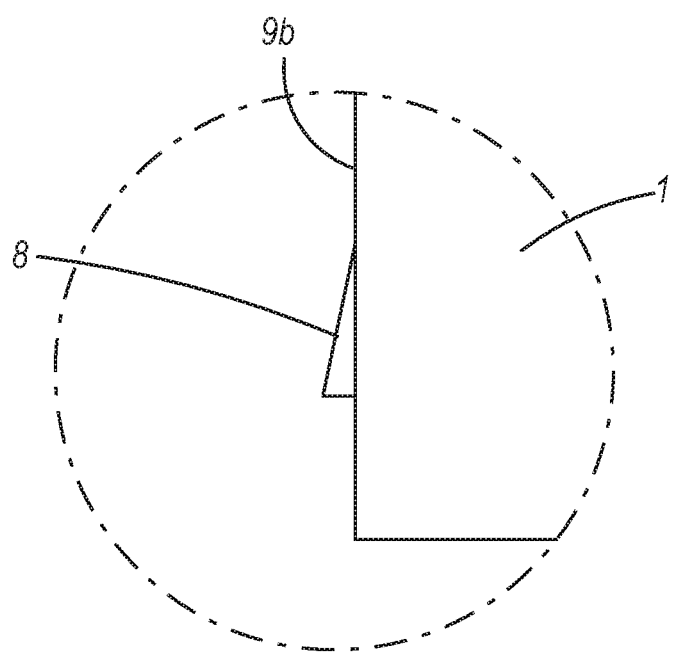
FIG. 23B is a detailed view of a portion of FIG. 23A.

FIG. 21 shows a top view of fastener 10 viewed along the first axis. As shown in shadow lines, according to one embodiment, screw receiving hole 3 is tapered with a wider opening 5 at front end of the fastener. FIG. 22 shows a cross section of the fastener showing the surface 6 of the tapered screw receiving hole 3. FIG. 23A shows a front view of fastener 10 along the length of hole 3 with tapered surface 6 visible through opening 5. A fastener 10 according to this embodiment may be adapted to allow connections to be made using screws or other fasteners with a variety of diameters. The screw can engage surface 6 along the length of hole 3 with a larger diameter screw first engaging surface 6 nearer opening 5 and a narrower screw first engaging surface 6 farther along the length of the hole. For example, a fastener according to this embodiment could accommodate screws that are either ISO or ASTM standard sizes.

As with embodiments discussed regarding FIGS. 1-11, a radiused or chamfered edge 7a is provided at second end 11 of element 2. Edge 7a facilitates insertion of fastener 10 into blind hole portion 121 of fastener cavity 120, as shown in FIGS. 17 and 18. According to this embodiment, retaining element 1 is also provided with a radiused or chamfered edge 7b. Edge 7b facilitates insertion of the fastener 10 into recessed portion 122 of cavity 120.

One or more barbs 8 are provided on the side surfaces 9b of retention element 1. As shown in detail in FIG. 23B, according to one embodiment, barbs 8 are narrower toward the panel facing surface 4. This configuration facilitates the insertion of fastener 10 into fastener cavity 120. Barbs 8 extend away from the side surfaces 9b of retention element 1, forming a ramped surface that engages upper sides 140 of cavity 120. Barbs 8 may have a sharp apex to bite into upper sides 140 to hold the fastener in the cavity. This may allow the fastener 10 to be retained in the cavity when the panel is subject to vibration or when the panel is tilted. According to one embodiment, panels may be assembled with fasteners 10 positioned in cavities 120 by a manufacturer and provide to customers ready to accept installation of screws 300.

FIG. 24 is a perspective view of a fastener 10 according to yet another exemplary embodiment of the disclosure. Screw receiving element 2 extends along a first axis and is connected at its first end with retaining element 1. Screw receiving hole 3 extends through element 2. Hole 3 may have an oblong shape, as discussed above, to accommodate various thicknesses of panels and may have a tapered inner surface. Alternatively, hole 3 may be a round hole. In this embodiment, retaining element 1 extends in two directions in the direction of hole 3 with a first lobe 1a extending away from the exit of hole 3 and second lobe 1b extending away from the entrance 5 of hole 3. According to another embodiment, retaining element 1 extends perpendicular to the axis of screw receiving hole 3 with first lobe 1a extending to the left of the axis of hole 3 and second lobe 1b extending to the right of the axis of hole 3. According to a further embodiment, retaining element 1 may be oriented at an oblique angle with respect to the axis of hole 3. According to yet another embodiment, retaining element includes lobes extending in three or more directions. According to other embodiments, retaining element 1 can have a variety of shapes, for example, a polygonal shape, an oval shape, an irregular shape, and the like. As shown in FIG. 24, one or more barbs 8 are provided on side surfaces 9b of retaining element 1 to hold the fastener in the cavity 120 of a panel being connected.

While the exemplary embodiments described herein are used with MDF panels, the fastener design is not limited to MDF, and may be applied to any connection involving similar parameters, requirements, or considerations.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims. Therefore, the description should not be construed as limiting the scope of the invention.

What is claimed is:

1. A fastener comprising:
    a screw receiving element extending along a first axis and having a side and a first end and a second end;
    a screw receiving hole extending into the side of the screw receiving element between the first and second ends; and
    a retention element arranged at the first end of the screw receiving element,
    wherein the retention element is plate-shaped and extends in a plane perpendicular to the first axis of the screw receiving element;
    wherein the retention element comprises one or more edge surfaces and wherein at least one of the edge surfaces comprises a barb.

2. The fastener according to claim 1, wherein the retention element comprises one or more lobes extending in the plane perpendicular to the first axis.

3. The fastener according to claim 2, wherein the retention element comprises two lobes and wherein each lobe extends in opposite directions in the plane.

4. The fastener according to claim 1, wherein the retention element comprises a polygonal shape, an oval shape, or an irregular shape.

5. The fastener according to claim 1, wherein the second end of the screw receiving element comprises a radiused or chamfered edge.

6. The fastener according to claim 1, wherein the retention element comprises a planar outer face, the outer face disposed on a surface of the retention element opposite to the screw receiving element.

7. The fastener according to claim 1, wherein the screw receiving element is cylindrical and wherein the screw receiving hole extends along a diameter of the screw receiving element.

8. The fastener according to claim 1, wherein the screw receiving hole has a circular cross section.

9. The fastener according to claim 1, wherein the screw receiving hole has an oblong cross section and wherein a major axis of the oblong cross section is along the first axis.

10. The fastener according to claim 1, wherein the screw receiving hole comprises a tapered portion.

11. A joint comprising a first panel, a second panel, a screw, and a fastener:
    the first panel comprising a first through hole extending through a first thickness thereof;
    the second panel comprising an outside surface, a fastener cavity, and a second through hole aligned with the first through hole and extending from an edge of the second panel to the fastener cavity, wherein the fastener cavity has an inner surface of substantially the same shape as an outer surface of the fastener and wherein the fastener cavity comprises a blind hole portion and a recessed portion;
    the fastener comprising:
    a screw receiving element extending along a first axis and having a side, a first end, and a second end, wherein screw receiving element is disposed in the blind hole portion of the cavity;
    a screw receiving hole extending into the side of the screw receiving element between the first and second ends, the screw receiving hole aligned with the first and second through holes of the first and second panels; and a retention element arranged at the first end of the screw receiving element and extending in a plane perpendicular to the first axis of the screw receiving element;

wherein the retention element is disposed in the recessed portion of the cavity, wherein engagement between the retaining element and the recessed portion of the cavity aligns the screw receiving hole and the second through hole, and wherein the screw passes through the first and second through holes and at least partially into the screw receiving hole of the screw receiving element;

wherein the retaining element further comprises one or more barbs arranged to engage with a surface of the cavity.

12. The joint according to claim 11, wherein the retention element further comprises a panel facing surface and an outward facing surface, wherein the recessed portion of the cavity comprises an inner surface parallel to the outside surface of the second panel and wherein the panel facing surface contacts the inner surface of the cavity and the outward facing surface is substantially coplanar with the outside surface of the second panel.

13. The joint according to claim 11, wherein the screw receiving element is cylindrical and wherein the screw receiving hole extends along a diameter of the screw receiving element.

14. The joint according to claim 11, wherein the screw receiving hole has an oblong cross section and wherein a major axis of the oblong cross section is along the first axis.

15. The joint according to claim 11, wherein the screw receiving hole comprises a tapered portion and wherein the screw engages the tapered portion.

16. The joint according to claim 11, wherein the second end of the screw retaining element comprises a radiused or chamfered edge and wherein the radiused or chamfered edge is shaped to facilitate insertion of the fastener into the cavity.

* * * * *